(12) United States Patent
Engel et al.

(10) Patent No.: US 9,292,150 B2
(45) Date of Patent: Mar. 22, 2016

(54) DISPLAY CONTROL SYSTEM

(75) Inventors: Gabriel Damon Engel, Hamilton (NZ);
David John Ferguson, Cambridge (NZ);
Harnish John Ogilvie MacLeod,
Auckland (NZ); Bruce David Seymour,
Plainville, CT (US)

(73) Assignee: PURE DEPTH LIMITED, Auckland (NZ)

( * ) Notice: Subject to any disclaimer, the term of this patent is extended or adjusted under 35 U.S.C. 154(b) by 468 days.

(21) Appl. No.: 13/443,764

(22) Filed: Apr. 10, 2012

(65) Prior Publication Data

US 2013/0104061 A1    Apr. 25, 2013

Related U.S. Application Data

(63) Continuation of application No. 10/557,157, filed as application No. PCT/NZ2004/000092 on May 17, 2004, now Pat. No. 8,154,473.

(51) Int. Cl.
| | |
|---|---|
| *G06F 3/14* | (2006.01) |
| *G06F 3/048* | (2013.01) |
| *G09G 3/36* | (2006.01) |

(Continued)

(52) U.S. Cl.
CPC *G06F 3/048* (2013.01); *G09G 3/36* (2013.01); *G09G 5/14* (2013.01); *H04N 13/0495* (2013.01); *G09G 2300/023* (2013.01); *G09G 2340/10* (2013.01)

(58) Field of Classification Search
CPC .................................. G06F 3/14; G06F 3/17
USPC .......... 715/200–277, 700–867; 700/701–866; 709/201–229; 705/50–79; 345/30–111
See application file for complete search history.

(56) References Cited

U.S. PATENT DOCUMENTS

| | | |
|---|---|---|
| 3,863,246 A | 1/1975 | Trcka et al. |
| 3,967,881 A | 7/1976 | Moriyama et al. |
| 4,239,349 A | 12/1980 | Scheffer |

(Continued)

FOREIGN PATENT DOCUMENTS

| | | |
|---|---|---|
| CN | 1293805 | 5/2001 |
| CN | 1294695 | 5/2001 |

(Continued)

OTHER PUBLICATIONS

Translated Japanese Office Action Jul. 7, 2008—provided to show relevance of the following references: JP 49-25387, JP 52-130340, JP 58-108574, JP 58-187880, JP 60-209781, JP 62-250477.

*Primary Examiner* — Ruay Ho

(57) ABSTRACT

A display control system for a multi-layer display system including at least one multi-layer display unit. A multi-layer display unit includes multiple stacked or overlapped display layers each adapted to render display elements thereon for viewing through the uppermost display layer. The level of difficulty for a user to view an overlapped image differs depending on the color, brightness or type of images (for example text-on-text) being displayed and also the layer in which the image is being displayed and whether the image is currently active. At least any overlapping portion of display elements from different display layers are adjusted (automatically or by a user) in order to improve the viewing experience for a viewer. Types of adjustment possible include moving the images within their display layer or to an alternative display layer or altering their visual properties (such as color, brightness, contrast, etc.).

20 Claims, 3 Drawing Sheets

(51) Int. Cl.
   *G09G 5/14* (2006.01)
   *H04N 13/04* (2006.01)

(56) References Cited

U.S. PATENT DOCUMENTS

| | | | |
|---|---|---|---|
| 4,294,516 A | 10/1981 | Brooks | |
| 4,333,715 A | 6/1982 | Brooks | |
| 4,364,039 A | 12/1982 | Penz | |
| 4,371,870 A | 2/1983 | Biferno | |
| 4,423,929 A | 1/1984 | Gomi | |
| 4,443,062 A | 4/1984 | Togashi et al. | |
| 4,472,737 A | 9/1984 | Iwasaki | |
| 4,485,376 A | 11/1984 | Noble | |
| 4,523,848 A | 6/1985 | Gorman et al. | |
| 4,556,286 A | 12/1985 | Uchida et al. | |
| 4,562,433 A | 12/1985 | Biferno | |
| 4,568,928 A | 2/1986 | Biferno | |
| 4,648,691 A | 3/1987 | Oguchi et al. | |
| 4,649,425 A | 3/1987 | Pund | |
| 4,712,869 A | 12/1987 | Claxton | |
| 4,757,626 A | 7/1988 | Weinreich | |
| 4,768,300 A | 9/1988 | Rutili | |
| 4,815,742 A | 3/1989 | Augustine | |
| 4,927,240 A | 5/1990 | Stolov et al. | |
| 4,947,257 A | 8/1990 | Fernandez et al. | |
| 5,049,870 A | 9/1991 | Fitzgerald et al. | |
| 5,050,965 A | 9/1991 | Conner et al. | |
| 5,075,993 A | 12/1991 | Weinreich | |
| 5,091,720 A | 2/1992 | Wood | |
| 5,112,121 A | 5/1992 | Chang et al. | |
| 5,113,272 A | 5/1992 | Reamey | |
| 5,124,803 A | 6/1992 | Troxel | |
| 5,198,936 A | 3/1993 | Stringfellow | |
| 5,255,028 A | 10/1993 | Biles | |
| 5,255,356 A | 10/1993 | Michelman et al. | |
| 5,283,560 A | 2/1994 | Bartlett | |
| 5,289,297 A | 2/1994 | Bollman et al. | |
| 5,298,892 A | 3/1994 | Shapiro et al. | |
| 5,300,942 A | 4/1994 | Dolgoff | |
| 5,302,946 A | 4/1994 | Shapiro et al. | |
| 5,317,686 A | 5/1994 | Salas et al. | |
| 5,333,255 A | 7/1994 | Damouth | |
| 5,361,165 A | 11/1994 | Stringfellow et al. | |
| 5,367,801 A | 11/1994 | Ahn | |
| 5,369,450 A | 11/1994 | Haseltine et al. | |
| 5,396,429 A | 3/1995 | Hanchett | |
| 5,416,890 A | 5/1995 | Beretta | |
| 5,416,895 A | 5/1995 | Anderson et al. | |
| 5,418,898 A | 5/1995 | Zand et al. | |
| 5,463,724 A | 10/1995 | Anderson et al. | |
| 5,465,101 A | 11/1995 | Akiba et al. | |
| 5,473,344 A | 12/1995 | Bacon et al. | |
| 5,475,812 A | 12/1995 | Corona et al. | |
| 5,479,185 A | 12/1995 | Biverot | |
| 5,502,805 A | 3/1996 | Anderson et al. | |
| 5,515,484 A | 5/1996 | Sfarti et al. | |
| 5,585,821 A | 12/1996 | Ishikura et al. | |
| 5,590,259 A | 12/1996 | Anderson et al. | |
| 5,600,462 A | 2/1997 | Suzuki et al. | |
| 5,600,765 A | 2/1997 | Ando et al. | |
| 5,604,854 A | 2/1997 | Glassey | |
| 5,623,591 A | 4/1997 | Cseri | |
| 5,638,499 A | 6/1997 | O'Connor et al. | |
| 5,638,501 A | 6/1997 | Gough et al. | |
| 5,648,789 A | 7/1997 | Beadles et al. | |
| 5,651,107 A | 7/1997 | Frank et al. | |
| 5,663,746 A | 9/1997 | Pellenberg et al. | |
| 5,664,127 A | 9/1997 | Anderson et al. | |
| 5,675,755 A * | 10/1997 | Trueblood | 715/791 |
| 5,694,150 A | 12/1997 | Sigona et al. | |
| 5,694,532 A | 12/1997 | Carey et al. | |
| 5,695,346 A | 12/1997 | Sekiguchi et al. | |
| 5,721,847 A | 2/1998 | Johnson | |
| 5,729,219 A | 3/1998 | Armstrong et al. | |
| 5,745,197 A | 4/1998 | Leung et al. | |
| 5,757,522 A | 5/1998 | Kulick et al. | |
| 5,764,317 A | 6/1998 | Sadovnik et al. | |
| 5,772,446 A | 6/1998 | Rosen | |
| 5,796,455 A | 8/1998 | Mizobata et al. | |
| 5,805,163 A * | 9/1998 | Bagnas | 715/768 |
| 5,805,171 A | 9/1998 | St. Clair et al. | |
| 5,813,742 A | 9/1998 | Gold et al. | |
| 5,825,436 A | 10/1998 | Knight | |
| 5,828,420 A | 10/1998 | Marshall et al. | |
| 5,831,615 A | 11/1998 | Drews et al. | |
| 5,835,088 A | 11/1998 | Jaaskelainen, Jr. | |
| 5,880,742 A | 3/1999 | Rao et al. | |
| 5,883,623 A | 3/1999 | Cseri | |
| 5,883,627 A | 3/1999 | Pleyer | |
| 5,883,635 A | 3/1999 | Rao et al. | |
| 5,890,174 A | 3/1999 | Khanna et al. | |
| 5,923,307 A | 7/1999 | Hogle, IV | |
| 5,924,870 A | 7/1999 | Brosh et al. | |
| 5,963,197 A | 10/1999 | Bacon et al. | |
| 5,982,417 A | 11/1999 | Blonde | |
| 5,990,990 A | 11/1999 | Crabtree | |
| 5,999,191 A | 12/1999 | Frank et al. | |
| 6,005,654 A | 12/1999 | Kipfer et al. | |
| 6,016,385 A | 1/2000 | Yee et al. | |
| 6,018,379 A | 1/2000 | Mizobata et al. | |
| 6,031,530 A | 2/2000 | Trueblood | |
| 6,037,937 A | 3/2000 | Beaton et al. | |
| 6,054,969 A | 4/2000 | Haisma | |
| 6,057,814 A | 5/2000 | Kalt | |
| 6,061,110 A | 5/2000 | Hisatake et al. | |
| 6,072,489 A | 6/2000 | Gough et al. | |
| 6,075,531 A | 6/2000 | DeStefano | |
| 6,085,202 A | 7/2000 | Rao et al. | |
| 6,097,361 A | 8/2000 | Rohner | |
| 6,100,862 A | 8/2000 | Sullivan | |
| 6,111,614 A | 8/2000 | Mugura et al. | |
| 6,118,427 A | 9/2000 | Buxton et al. | |
| 6,163,318 A | 12/2000 | Fukuda et al. | |
| 6,181,349 B1 | 1/2001 | Bardon et al. | |
| 6,204,902 B1 | 3/2001 | Kim et al. | |
| 6,215,490 B1 * | 4/2001 | Kaply | 715/788 |
| 6,215,538 B1 | 4/2001 | Narutaki et al. | |
| 6,215,898 B1 | 4/2001 | Woodfill et al. | |
| 6,239,852 B1 | 5/2001 | Oono et al. | |
| 6,246,407 B1 | 6/2001 | Wilks et al. | |
| 6,269,173 B1 | 7/2001 | Hsien | |
| 6,282,551 B1 | 8/2001 | Anderson et al. | |
| 6,300,990 B1 | 10/2001 | Yamaguchi et al. | |
| 6,317,128 B1 | 11/2001 | Harrison et al. | |
| 6,327,592 B1 | 12/2001 | Yoshikawa | |
| 6,341,439 B1 | 1/2002 | Lennerstad | |
| 6,351,298 B1 | 2/2002 | Mitsui et al. | |
| 6,356,281 B1 | 3/2002 | Isenman | |
| 6,377,229 B1 | 4/2002 | Sullivan | |
| 6,388,648 B1 | 5/2002 | Clifton et al. | |
| 6,418,426 B1 | 7/2002 | Schlesinger | |
| 6,438,515 B1 | 8/2002 | Crawford et al. | |
| 6,443,579 B1 | 9/2002 | Myers | |
| 6,466,185 B2 | 10/2002 | Sullivan et al. | |
| 6,468,157 B1 | 10/2002 | Hinami et al. | |
| 6,496,832 B2 | 12/2002 | Chi et al. | |
| 6,505,209 B1 | 1/2003 | Gould et al. | |
| 6,525,699 B1 | 2/2003 | Suyama et al. | |
| 6,538,660 B1 | 3/2003 | Celi, Jr. et al. | |
| 6,587,094 B2 | 7/2003 | Anderson | |
| 6,717,728 B2 | 4/2004 | Putilin | |
| 6,845,578 B1 | 1/2005 | Lucas | |
| 2003/0069074 A1 | 4/2003 | Jackson | |
| 2006/0227249 A1 | 10/2006 | Chen et al. | |

FOREIGN PATENT DOCUMENTS

| | | |
|---|---|---|
| EP | 0732669 | 1/2003 |
| JP | 62-235929 | 10/1987 |
| JP | 63-65795 | 3/1988 |
| JP | 63-100898 | 5/1988 |
| JP | 1-229591 | 9/1989 |
| JP | 2-90127 | 3/1990 |
| JP | 3-226095 | 10/1991 |

(56) References Cited

FOREIGN PATENT DOCUMENTS

| | | |
|---|---|---|
| JP | 6-274305 | 9/1994 |
| JP | 6-314181 | 11/1994 |
| JP | 63-39299 | 12/1994 |
| JP | 7-44349 | 2/1995 |
| JP | 8-83160 | 3/1996 |
| JP | 9-230825 | 9/1997 |
| JP | 9244057 | 9/1997 |
| JP | 10-260784 | 9/1998 |
| JP | 10-334275 | 12/1998 |
| JP | 2001-100689 | 4/2001 |
| JP | 2000-99237 | 10/2001 |
| JP | 2002-131775 | 5/2002 |
| JP | 2001-56675 | 9/2002 |
| JP | 2003-316335 | 11/2003 |
| WO | 96/27992 | 9/1996 |
| WO | 99/44095 | 9/1999 |
| WO | 01/15127 | 3/2001 |
| WO | 02/35277 | 5/2002 |
| WO | 0157799 | 6/2002 |
| WO | 03032058 | 4/2003 |
| WO | 2004001488 | 1/2004 |
| WO | 2004102520 | 11/2004 |

\* cited by examiner

DISPLAY CONTROL SYSTEM

CROSS REFERENCE TO RELATED APPLICATIONS

This application claims priority to and the benefit of the International Application Serial Number PCT/NZ04/000092, having an International Filing Date of 17 May 2004, which claims priority to New Zealand Patent Application No. 525956, filed on 16 May 2003, both of which are herein incorporated by reference in its entirety. Further, this application is a continuation of and claims priority to and the benefit of U.S. application Ser. No. 10/557,157, entitled "DISPLAY CONTROL SYSTEM," with filing date 5 Mar. 2007, which is herein incorporated by reference in its entirety, which claims priority to and the benefit of the above referenced International Application Serial Number PCT/NZ04/000092 and New Zealand Patent Application No. 525956.

TECHNICAL FIELD

This invention relates to a display control system and more particularly though not solely to a method and apparatus for simplifying the operation of and/or improving a user's viewing experience with a multi-layer display system (a display system consisting of one multi-layer display (MLD) device, multiple interconnected MLD devices, or interconnected single layer display (SLD) devices and/or MLD devices).

BACKGROUND ART

Multi-layered displays provide a significant Improvement over existing single layer displays (SLD) or screens. MLD units may be used to nest display content over spacially displaced or stacked or sandwiched layers to provide an enhanced mechanism for information absorption and analysis by users. An example of an existing multi-layer display is discussed for example in WO9942889A in which each layer may be, for example, a selectively transparent Liquid Crystal Display (LCD) layer having the ability to display Images of adjustable transparency.

In commonly available SLD and MLD units, a backlighting system is provided behind the display layer or layers. The resultant image provided to a user of the display is the result of selective filtering, by the display layer or layers, of the light produced by the backlight before it reaches the user's eyes. In an SLD unit, display elements (such as GUI windows, images icons or even pixels) within the single display layer may be overlaid at will and software utilised to control the appearance of the display elements. For example, in Microsoft®'s Windows® operating system, various windows may be overlapped and the currently "in focus" (or active, or highlighted or "foreground") window will always be shown in its entirety whereas any overlapped or occluded portion of another window will effectively be cut off or hidden, behind the in focus or foreground window. This provides a very basic Illusion of depth to an SLD unit.

However, in an MLD unit, because Images on all but the rearmost display layer are at least partially transparent, overlapping of display elements can lead to viewing difficulties. The degree of the viewing difficulty is dependent upon whether the respective display elements are assigned to different display layers, the colour or contrast of the respective display elements and also depends on which of the display elements are currently in focus. For example, in a two layer MLD unit, a dark image on the rear display layer (the layer closest to the backlighting system or rear of the screen) which overlaps with a display element on the front display layer, will reduce the intensity of light available to illuminate the front layer display element. Accordingly, even if the display element on the front layer is in focus, the appearance to a user of its overlapped portion will be altered (that is, it will be darker or dimmer or even a different colour than intended) in comparison to its non-occluded portion. In some circumstances, this can make it virtually impossible for a user to correctly or comfortably view the foreground display element.

There are also known display technologies for display layers in which the layer itself emits light rather than utilising a backlight. This technology is in its infancy and although the aforementioned problem of a dark or opaque rear display element reducing the available light for an overlapped front display element is reduced or eliminated, there is still a problem in that the appearance of overlapping portions of display elements in different layers can interfere, thereby reducing the legibility or discernability of the Information displayed (where legibility relates to the distinctness that makes perception or reading easy).

An example of the aforementioned problem occurs when two display elements such as GUI windows, both displaying text, are positioned over each other (that is, they overlap) in separate display layers of a multi-layer display device. The result is that the text on both layers is very difficult (if not impossible) to read. "Text-On-Text" is the name which we use to describe the problem however it is not limited to situations involving only text. Overlaying text on a graphic image (or vice versa) can have the same effect of rendering the text difficult to read. More specifically, the problem is at its worst:

when there is very little contrast (that is, difference in colour, pattern, brightness etc) between the overlapped display elements or images displayed on different display layers, and/or when at least one display layer is displaying cluttered information.

In some instances, to assist in the effective display of information to users it is of advantage to swap particular components of display content between the layers of the MLD units. This allows high priority information or information of high importance to be presented at the forefront of an observer's area of observation. This facility also allows a degree of control and flexibility with respect to how particular groups of display elements (for example GUI windows) may be nested and collected together for the consideration of related information.

Conventionally however, MLD units have been operated using software for controlling interconnected SLD units. For example, two single layer display devices may be connected to a single video output of a computer for example, and the screens are combined so that the row of pixels along one edge (for example the right hand edge) of a first device are considered to be immediately adjacent to the row of pixels along one edge (for example the left hand edge) of the second device. In this way, movement of a cursor or window past the right hand edge of the first device causes the cursor or image to appear at the left hand edge of the second device as if the two display devices were a single display layer in the same plane.

In an MLD unit, the separate display layers are instead stacked in parallel planes but the same software for manipulating objects or display elements is conventionally employed. Accordingly, in order for a user currently working in a first display layer to move a display element from a second display layer to the first display layer of an MLD unit, it has conventionally been necessary for the user to first move their mouse pointer to an edge of the first display layer and on to the second display layer, select the desired display element and either drag that element back across the second display layer and on to the first layer or, once the display element has been selected, alter its properties in such a way that it is automatically shifted by appropriate software to the first display layer.

An improved method, system, apparatus or computer software which monitored and automatically improved the legibility or discernability or "viewability" of display elements in an MLD system and/or assisted users in assigning display elements to layers or in transferring display elements between layers of an MLD system would be of advantage. It would be preferable to have hardware or software code or a set of algorithmic instructions programmed into a computer system or other types of programmable logic devices, which when run, address the issues discussed above.

All references, including any patents or patent applications cited in this specification are hereby Incorporated by reference. No admission is made that any reference constitutes prior art. The discussion of the references states what their authors assert, and the applicants reserve the right to challenge the accuracy and pertinency of the cited documents. It will be clearly understood that, although a number of prior art publications are referred to herein, this reference does not constitute an admission that any of these documents form part of the common general knowledge in the art, in New Zealand or in any other country.

It is acknowledged that the term 'comprise' may, under varying jurisdictions, be attributed with either an exclusive or an inclusive meaning. For the purpose of this specification, and unless otherwise noted, the term 'comprise' shall have an inclusive meaning—i.e. that it will be taken to mean an inclusion of not only the listed components it directly references, but also other non-specified components or elements. This rationale will also be used when the term 'comprised' or 'comprising' is used in relation to one or more steps in a method or process.

It is therefore an object of the present invention to provide a display controller or display control method or display layer transfer method which will go at least some way towards addressing the foregoing problems or which will at least provide the public or industry with a useful choice.

Further aspects and advantages of the present invention will become apparent from the ensuing description which is given by way of example only.

DISCLOSURE OP INVENTION

Accordingly, in a first aspect the invention consists in a display control method for a multi-layer display system including at least two overlapping display layers, the display control method comprising the steps of:
i) detecting that the position of a first display element to be displayed on a first display layer overlaps or will potentially overlap with the position of a second display element on a different display layer,
ii) adjusting either the position of the first and/or second display element and/or at least one visual property of at least the overlapping or potentially overlapping portion of the first and/or second display element, and
iii) displaying the first and second display elements on their respective display layers in their adjusted position or positions or with their adjusted visual property or properties in order to Improve the ability of a user of the multi-layer display system to view the overlapping or potentially overlapping portion of the first and/or second display element.

Preferably, the step of adjusting is carried out manually by a user.

Alternatively, the step of adjusting is carried out automatically.

Preferably, the step of automatically adjusting comprises:
determining a level of interference as experienced by a user between the first and second display elements, and
moving the first and/or second display element within their respective display layers, to a new position or positions which reduces the determined level, and/or
changing at least one visual characteristic of the first and/or second display element.

Preferably, the step of adjusting the position of a first and/or second display element comprises moving the first and/or second display element within their respective display layers, so that there will be no overlap or reduced overlap between the first and second display elements.

Preferably, the method also includes the step of determining whether the first or second display element is currently active and the step of adjusting is carried out dependent upon this determination.

Preferably, the first display layer is nearer to the front of the multi-layer display system than the second display layer and
if the first display element is active and the second display element is not active, then at least one visual property of at least the overlapping or potentially overlapping portion of the second display element is adjusted, or
if the second display element is active and the first display element is not active, then at least one visual property of at least the overlapping or potentially overlapping portion of the first display element is adjusted.

Preferably, the step of adjusting comprises adjusting at least one of colour, saturation, brightness or transparency of at least the overlapping or potentially overlapping portion of the first and/or second display element or the contrast between overlapping or potentially overlapping portions of the first and second display elements.

Preferably, the step of adjusting comprises combining at least one visual property of the overlapping or potentially overlapping portions of the first and second display elements and the resultant combined visual property is applied to the overlapping portion of the active display element while at least one visual property of the other display element is adjusted to minimise its effect on the image provided by the active display element.

Alternatively, the step of adjusting comprises adjusting at least one visual property of at least the overlapping portion of both the first and second display elements.

Preferably, the method also comprises the step of allocating the first and/or second display element to a selected display layer or layers based upon the at least one determined visual property or upon an associated pre-set display layer preference.

Preferably, the step of allocating is based upon stored preferences associated either with a user of the multi-layer display system or with particular software application programs run on a computer system to which the multi-layer display system is connected.

Preferably, when a particular display layer includes a plurality of display elements, the display elements are arranged within that display layer to thereby control the way in which overlapping portions of display elements in a single display layer are displayed.

Preferably, when a plurality of display elements are dispersed across at least two display layers, the display elements are arranged over the at least two display layers thereby controlling the way in which overlapping portions of display elements on different display layers are displayed.

Preferably, the colours of at least the overlapping portion of the first and second display elements are adjusted on a pixel-by-pixel basis.

In a second aspect, the invention consists in a display controller for a multi-layer display system including at least two overlapping display layers, the display controller comprising:

i) means for detecting that the position of a first display element to be displayed on a first display layer overlaps or will potentially overlap with the position of a second display element on a different display layer, ii) means for adjusting either the position of the first and/or second display element and/or at least one visual property of at least the overlapping or potentially overlapping portion of the first and/or second display element, and iii) means for displaying the first and second display elements on their respective display layers in their adjusted position or positions or with their adjusted visual property or properties in order to improve the ability of a user of the multi-layer display system to view the overlapping or potentially overlapping portion of the first and/or second display element.

Preferably, the means for adjusting are operated manually by a user.

Alternatively, the means for adjusting operate automatically.

Preferably, the means for automatically adjusting the position of a first and/or second display element comprises:

means for determining a level of interference as experienced by a user between the first and second display elements, and means for moving the first and/or second display element within their respective display layers, to a new position or positions which reduces the determined level, and/or means for changing at least one visual characteristic of the first and/or second display element.

Preferably, the means for adjusting the position of a first and/or second display element moves the first and/or second display element within their respective display layers, so that there will be no overlap or reduced overlap between the first and second display elements.

Preferably, the display controller also comprises means for determining whether the first or second display element is currently active and providing this information to the means for adjusting.

Preferably, the first display layer is nearer to the front of the multi-layer display system than the second display layer and if the first display element is active and the second display element is not active, then at least one visual property of at least the overlapping or potentially overlapping portion of the second display element is adjusted, or if the second display element is active and the first display element is not active, then at least one visual property of at least the overlapping or potentially overlapping portion of the first display element is adjusted.

Preferably, the means for adjusting adjusts at least one of colour, saturation, brightness or transparency of at least the overlapping or potentially overlapping portion of the first and/or second display element or the contrast between overlapping or potentially overlapping portions of the first and second display elements.

Preferably, the means for adjusting combines at least one visual property of the overlapping or potentially overlapping portions of the first and second display elements and the resultant combined visual property is applied to the overlapping portion of the active display element while at least one visual property of the other display element is adjusted to minimise its effect on the image provided by the active display element.

Alternatively, the means for adjusting adjusts at least one visual property of at least the overlapping portion of both the first and second display elements.

Preferably, the display controller also allocates the first and/or second display element to a selected display layer or layers based upon the at least one determined visual property or upon an associated pre-set display layer preference.

Preferably, the allocation to display layers is based upon stored preferences associated either with a user of the multi-layer display system or with particular software application programs run on a computer system to which the multi-layer display system is connected.

Preferably, when a particular display layer includes a plurality of display elements, the display elements are arranged within that display layer to thereby control the way in which overlapping portions of display elements in a single display layer are displayed.

Preferably, when a plurality of display elements are dispersed across at least two display layers, the display elements are arranged over the at least two display layers thereby controlling the way in which overlapping portions of display elements on different display layers are displayed.

Preferably, the colours of at least the overlapping portion of the first and second display elements are adjusted on a pixel-by-pixel basis.

In a third aspect, the invention consists in a method of user manipulation of display elements in a multi-layer display system including at least two overlapping display layers comprising the steps of:

i) providing a user interface having a visual representation of all of the display layers and symbols representing the display elements on each display layer, ii) allowing a user to select a symbol in the interface representing a display element on a particular display layer, iii) allowing the user to manipulate at least one property of the selected symbol, and iv) adjusting at least one property of the display element represented by the selected and manipulated symbol in accordance with the result of the manipulation of the at least one property carried out on the selected symbol.

Preferably, the at least one property of the symbol manipulatable by a user includes the symbol's position in its present display layer, the display layer in which the symbol is positioned, whether the display element is active and the order of the display element within its display layer.

Preferably, the step of allowing a user to select a symbol results in the production of a display element selection identifier which identifies the particular display element to be manipulated.

Preferably, the movement of the selected symbol to a destination representation of a display layer in the user interface results in the production of a display layer selection identifier which identifies the destination layer to which the display element, represented by the selected symbol, is to be transferred.

Preferably, the user interface is provided in a particular display layer and is a miniaturised two dimensional representation of the display layers and display elements.

Preferably, the user interface is provided in the same display layer that a mouse pointer, movable by the user of the display system, is provided.

Preferably, the visual representation of the at least two overlapped display layers are shown side by side with no overlap.

Preferably, movement of a display element's symbol from the visual representation of a first display layer to a visual representation of a second display layer causes the display element represented by the symbol to move from the first display layer to the second display layer.

Preferably, the position of a symbol within a visual representation of a particular display layer corresponds to the position of the display element, represented by the symbol, within the particular display layer.

Preferably, the method of user manipulation also includes the display control method according to the first aspect.

In a fourth aspect, the invention consists in a multi-layer display system comprising:
- at least two overlapping display layers each of which are adapted to depict display elements thereon,
- a user interface having a visual representation of all of the display layers and symbols representing the display elements on each display layer,
- means to allow a user to select a symbol in the interface representing a display element on a particular display layer,
- means to allow the user to manipulate at least one property of the selected symbol, and
- means for adjusting at least one property of the display element represented by the selected and manipulated symbol in accordance with the result of the manipulation of the at least one property carried out on the selected symbol.

Preferably, the at feast one property of the symbol manipulatable by a user includes the symbol's position in its present display layer, the display layer in which the symbol is positioned, whether the display element is active and the order of the display element within its display layer.

Preferably, the selection of a symbol in the user interface results in the production of a display element selection identifier which identifies the particular display element to be manipulated.

Preferably, the movement of the selected symbol to a destination representation of a display layer in the user interface results in the production of a display layer selection identifier which identifies the destination layer to which the display element, represented by the selected symbol, is to be transferred.

Preferably, the user interface is provided in a particular display layer and is a miniaturised two dimensional representation of the display layers and display elements.

Preferably, the user interface is provided in the same display layer that a mouse pointer, movable by the user of the display system, is provided.

Preferably, the visual representation of the at least two overlapped display layers are shown side by side with no overlap.

Preferably, movement of a display element's symbol from the visual representation of a first display layer to a visual representation of a second display layer causes the display element represented by the symbol to move from the first display layer to the second display layer.

Preferably, the position of a symbol within a visual representation of a particular display layer corresponds to the position of the display element, represented by the symbol, within the particular display layer.

Preferably, a display controller in accordance with the second aspect is also provided.

MLD units can be used to present various different types of display elements on two or more display layers which are stacked or sandwiched or specially displaced from one another.

The present invention may facilitate a transfer of display elements between the layers of a single multi-layer display. However it will be appreciated that the present invention may be used to transfer display elements over a series of monitors or displays, both single layer and/or multi-layer, driven from a single output device such as a computer system. The device used to drive the MLD system may be a computer system, but it should be appreciated that other types of output devices and associated hardware may also be used in conjunction with the present invention.

Preferably the present invention may be adapted to provide a user interface which allows a user of a multi-layer display system to adjust the positioning or visual properties or organisation of display content presented by at least one multi-layer display. Such a user interface system may allow a user of the display or displays involved to fully customise how display content of interest is displayed with respect to the plurality of display layers available to them.

The present invention may be implemented through software code or computer based instructions loaded into a programmable logic device such as a computer system or microprocessor. The method of operation or steps executed by such software, in addition to the apparatus or system provided through physical hardware controlled by such software are also within the ambit of the present invention.

Alternatively, the present invention may be completely electrically "hard-wired" in hardware wherein input display elements are allocated to display layers according to a pre-assigned allocation regime. Furthermore, the present invention may receive input information relating to the positioning or ordering of display elements on a display adapter from hardware associated with the computer system. For example, the "Z-buffer" which is the section of memory in a video card which keeps track of which display elements can be viewed and which display elements are hidden behind other display elements, may be accessed by the present invention.

Preferably, a user interface implemented in conjunction with the present invention may have a number of different configurations depending on the particular application it is to be used with. For example, the software code or process implemented may form an operating system process, or can be run as a background service on the computer system driving the MLD unit or units involved.

The present invention may be adapted to facilitate the assignment or allocation of a display point or points (that is, a "display element") present within a wide variety of different types of display elements to a layer or layers of a multi-layer display system (that is, a display system incorporating at least one MLD and optionally other MLD and/or SLD units). The invention may be used, for example, to assign a display point or element on an SLD to a display layer on an MLD or vice-versa, or to assign a display point or element on a display layer of an initial MLD to a destination layer on that MLD or to a destination layer on another MLD. Alternatively, the invention may be used to assign a new display point or element which is yet to be displayed on any display layer to a display layer in the multi-layer display system.

The display elements can take many different forms, from for example, the various windows available under a graphical user interface for computer systems, to user input pointers such as mouse cursors, through to in some instances, components of the user interface of a computer operating system that displays information using the MLD involved. Furthermore, display elements present or embedded within Computer Aided Design (CAD) systems or photographic or video media may also be transferred using the present invention.

A user driven and controlled transfer of GUI (Graphical User Interface)-based windows, individual images, cursors, text pointers and/or other alternative forms of display elements in conjunction with the present invention may provide significant advantages to users of multi-layer displays. This allows the content of display elements to be organised and displayed across multiple layers for the effective communication of the information content involved to the user or observer of the display. Furthermore, the information involved may also be structured or organised to the benefit of a user across multiple layers to assist in analytical investigations of data or information.

The at least one display element selection identifier may be generated from or obtained by a user of the display interacting with or issuing commands to the computer system which uses the current MLD to present display elements. These types of element selection actions executed by users of the display can provide a trigger signal and also identity information with respect to a particular display element, such as a window or mouse pointer for example, being selected for a transfer between layers by the user.

The present invention may also incorporate one or more graphical user interface display control components which allow such element selection actions by a user to be captured, to in turn generate a display element selection identifier. For example, in one preferred embodiment the present invention may encompass the provision of a control component in the form of a toolbar type interface. This toolbar component may provide a number of icons, buttons, pull-down menus and other similar interface components to allow a user to select and identify a particular display element or window for transfer to an alternate layer and/or to alter its visual properties. A user's interaction with a control component can then constitute an element selection action. In response to such element selection actions, these types of control components may in turn generate or supply the display element selection identifier to further components of the present invention which facilitate the actual transfer of the display element involved to an alternate layer.

A single element selection action may in turn trigger the generation of a single display element selection identifier only. A single action may identify a single element for transfer in such embodiments. However, those skilled in the art should appreciate that other implementations of the present invention where groups of related display elements or windows may all be identified through a single element selection action are also envisioned.

The present invention may also employ or use at least one display layer selection identifier which is generated by or sourced from a layer selection action completed by a user. In such embodiments a further control component may be displayed on the MLD involved. Such a command component can be employed by a user to select preferably a destination layer for a particular selected display element. Furthermore, in some instances a single control component may also be used to generate both display element and display layer selection identifiers. In instances where a single 2-layer MLD is employed in conjunction with the present invention, the use of display layer selection identifiers need not be considered to be essential. In such instances the selection of a display element of a window will result in the element being transferred to the alternate layer of the single display.

Once a display element selection identifier and associated display layer selection identifier have been received by the software employed in conjunction with the present invention, a transfer of the identified element may be made to the identified display layer of the MLD involved. The control components employed as discussed above may allow a user to identify a particular display element or window to transfer to a particular display layer, and subsequently issue commands to execute the transfer of the element identified to the layer identified.

Both identifiers for the display element and destination display layer may be supplied to graphics software and drivers employed in conjunction with the MLD system. These components may normally manage the display of elements in the layers of the MLD system and on receipt of appropriate commands issued in conjunction with the present invention, may execute the transfer between layers of the selected display element.

The present invention may provide many potential advantages over the prior art.

The present invention may be adapted to provide a user interface facility which will allow a user of the MLD unit and associated driver device (such as a computer system), to control the layers on which specific display elements are presented and/or the visual properties of those display elements.

The present invention may allow a user to nest, organise and in general terms present specific components of display content depending on their own preferences and preferably in the best possible configuration for data analysis or information absorption purposes.

The present invention may also be implemented through software based facilities which can provide or employ recognisable command and control based components already familiar to users of computer systems which employ graphical user interfaces.

BRIEF DESCRIPTION OF DRAWINGS

Further aspects of the present invention will become apparent from the following description which is given by way of example only and with reference to the accompanying drawings in which.

BEST MODES FOR CARRYING OUT THE INVENTION

Figure 1A:
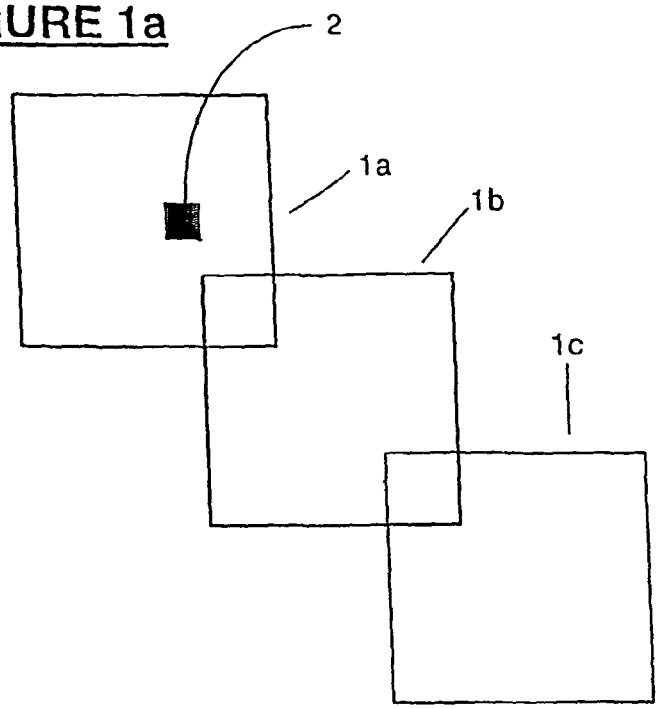
FIGS. 1a & 1b is a block schematic diagram of the display layers of a single multi-layer display device prior to and after the transfer of a display element between layers of the display using the present invention.
Figure 1B:
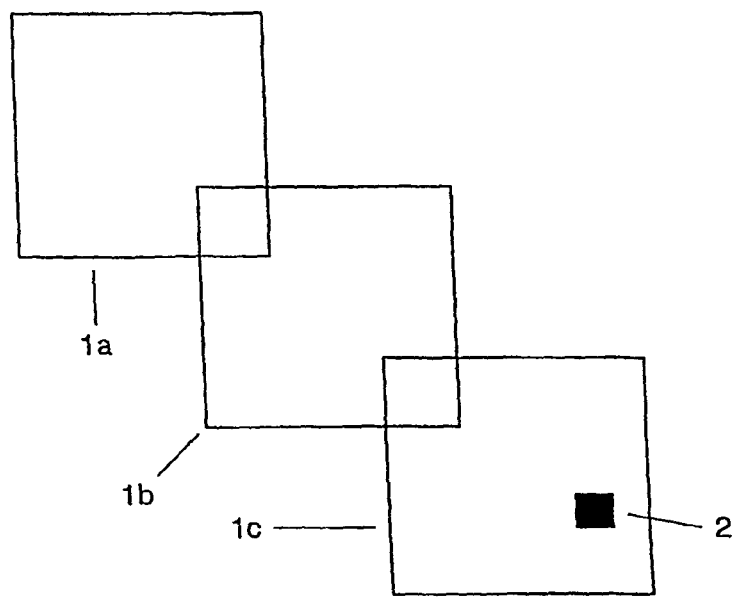

Adjustment of Visual Properties and/or Location of Display Elements to Improve Viewing Experience FIGS. 1a & 1b illustrate a block schematic diagram of the display layers of a single multi-layer display device prior to and after the transfer of a display element between display layers of the display using the present invention. Each display layer may comprise a LCD display layer which is selectively transparent with the ability to display images thereon.

In the instance shown, a series of display layers 1a, 1b, 1c are arranged and displaced in a line with respect to one another, however, in use, each of the layers are aligned, one directly in front of the next to form a stacked or sandwiched construction. A single display element, shown in this embodiment as a graphical user interface window 2 is presented on the front layer 1a in the initial situation shown with respect to FIG. 1a. Conversely, after a transfer made in conjunction with the present invention, the same display window has been transferred to the third rear display screen 1c as shown in FIG. 1b. This window 2 has either been repositioned after being selected by a user or observer of the display or automatically selected and moved, as has the display layer 1c on which the window involved is to be displayed.

In a first preferred embodiment, the transfer of display elements between layers and within layers is substantially automatically carried out with no or minimal user input. In this way, the MLD seamlessly appears to a user to act much like an SLD but with an improved visual experience, for example, improved depth of field, improved contrast of different display elements due to the use of multiple display layers which are at different focal lengths from a users eye.

This automatic control of the display of display elements on a display system including at least one MLD firstly requires the detection or reception of display elements for display, for example, from the video output of a computer system. Visual properties, such as brightness, contrast and colour of each display element are determined and the display elements are then allocated to appropriate display layers which are known to produce the best viewing experience for a user. For example, it may be best to have bright images/windows presented behind or beneath dark images/windows. Thus, the control system may intuitively allocate display elements to selected display layers in such a way that the ability of the user to view the combined display elements is maximised in a helpful and efficient manner.

Optionally, each user of the multi-layer display system could have a stored set of viewing preferences in memory associated with a display device or the computer system to which the multi-layer display is connected. In this way, each user would consistently view multiple display elements in a preferred way. For example, a particular user could prefer certain coloured display elements on a particular display layer or that user may prefer that brighter display elements are presented in front of darker display elements, either within a single display layer or over multiple display layers. These user preferences could then be stored in a data file, updated and retrieved when required in order to usefully automatically allocate display elements to and/or within layers.

Similarly, preference data files relating to certain software applications run on the computer system and viewed via the multi-layer display device could be stored. In this way, the control system could consistently display software applications to all users. For example, MICROSOFT® WORD could have a preference file instructing the control system to, for example, always display pop-up windows or dialogue boxes on the top layer of the multi-layer display device. The preference data file for each software application could be user created/modified or manufacturer created/modified.

Each display element in a graphical user interface in a multi-layer display is conventionally associated with parameters of its "x,y position", "layer" (and/or "screen" in multi-screen systems) and "order". The "order" parameter dictates which display element should be displayed in front of or behind any other display element when overlap of different display elements occurs. Overlap in the context of this specification means that, from a viewer's perspective, at least a portion of a first display element is obscured or blocked or occluded by a portion of a second display element (or by two or more other display elements). However, because multi-layer display devices have conventionally been treated as multiple stacked but separate devices, it has been possible for a display element on a back layer which is active (that is, the display element which the user is currently interacting with which is sometimes referred to as "in focus" or "in context") to unintentionally be obscured by a non-active display element on a front layer.

The present invention treats the multiple layers of an MLD holistically rather than as separate devices and, because of the stacked or sandwiched interrelationship of the display layers between the user and a backlighting system, faces the above unique problems not encountered in "mixed" display systems of multiple SLD units.

According to the present invention, the "order" parameter may be replaced by an "order within layer" parameter and a further parameter, "viewing order" may be provided. The "order within layer" parameter is equivalent to the conventional "order" parameter but will only apply within each respective layer. The new "viewing order" parameter will determine, over all display layers and over all interconnected display devices, which display element has precedence when overlap of display elements occurs. In this way, the above-mentioned problem of blocking of active windows can be avoided. As mentioned above, the present invention may be utilised in various types of multi-layer display systems including a single MLD, multiple interconnected MLD devices, or interconnected single-layer display (SLD) devices and MLD devices. Preferably however, at least one MLD is incorporated into the multi-layer display system.

As mentioned above, a problem occurs when two display elements such as GUI windows, both displaying text, are positioned over each other (that is, they overlap) in separate display layers of a multi-layer display device. The result is that the text on both layers is very difficult (if not impossible) to read. "Text-On-Text" is the name which we have given to the problem however it is not limited to situations involving text. Overlaying text on a graphic image (or vice versa) can have the same effect of rendering the text difficult to read. More specifically, the problem can be described as being at its worst:

when there is very little contrast between the overlapped display elements or images displayed on different display layers, and/or when at least one display layer is displaying cluttered information.

A solution which we have discovered to this problem is to use "alpha blending" on a multi-layer display system to effectively effect the transparency of, on a pixel by pixel basis, the information that is not active (that is, not presently selected or "in context"), whether it is on a front or rear display layer. Transparency could, for example, be increased by increasing the amount of white in the colour of a display element.

In computer graphics, each pixel is represented by three channels of 8-bit colour information—red, green, and blue—and sometimes a fourth channel called the alpha channel. The alpha channel controls the way in which other graphics information is displayed, such as the level of transparency or opacity of the pixel. Alpha blending is the name for this type of control, and it is used to simulate effects such as the visual effect obtained by placing a piece of glass in front of an object so that the object is either completely visible behind the glass, unviewable, or something in between. The alpha channel is really a mask which specifies how the pixel's colours should be merged with another pixel when the two are overlaid, one on top of the other.

The equation used in alpha blending in a single layer display is:

$$[r,g,b]_{blended\ pixel} = \alpha [r,g,b]_{foreground\ pixel} + (1-\alpha)[r,g,b]_{background\ pixel}$$

where [r, g, b] are the red, green, blue colour channels and α is a weighting factor.

The weighting factor is allowed to take any value from 0 to 1. When α is set to 0, the foreground pixel is completely transparent; when it is set to 1, the foreground pixel becomes opaque and totally obscures the background pixel; any intermediate value creates a mixture of the two pixel's "images".

In a three layer multi-layer display system for example, a single display point on the front panel of the display unit actually has three separate pixels, arranged one in front of the other. Accordingly, conventional alpha blending techniques which produce resultant RGB values for a single pixel are inappropriate in a multi-layer display environment which requires RGB values for each of the overlaid pixels in the separate display layers. However, a similar principle can be invoked in a multi-layer display system in which the original colour values of overlaid pixels are combined in appropriate ratios to provide resultant RGB values for each resultant overlaid pixel. Alternatively, for example, the term "alpha blending" as used herein may refer to the manipulation of a visual property (such as to increase transparency) of pixels in non-active display elements. In their respective display layers while the pixels in an overlapping active display element or elements in their display layer or layers are not altered at all.

There are several ways that alpha blending can be used to overcome the Text-on-Text problem in multi-layer display systems. For example:

1. the entire desktop (that is all display elements on all display layers) could be faded or have their transparency increased except for a particular display element (such as a window) or elements which is/are in context, or
2. only a particular display element (such as a window or windows) could have its transparency increased and everything else remains unaffected, or
3. all objects on a particular display layer could have their transparency increased.

In these ways, more light is thus able to be emitted from or through an out of context (or non-selected or non-active) display element so that it has less effect on an overlapped in-context display element.

In any event, at least the overlapping portion of two overlapped display elements may be alpha blended to a desired degree in order to ensure that the user is best able to view the information from both layers. Because multi-layer display devices are designed to provide depth perception to a user, there individual display layers are spaced apart. As a result, depending upon the viewer's position in front of the display device, the amount of overlap will appear to change. In order to account for this viewing angle/position variability, the present invention may alter a slightly larger portion of one or both of two overlapped display elements.

It is also possible to allow a user to control the level of transparency provided by alpha blending the overlapped display elements. Alternatively, an optimum α value that minimises the Text-On-Text effect while still allowing the out of context text to be read may be predetermined and defined as the preferred transparency point. The user (or software in an automated process) could then either set the text to "transparent" (which would initiate alpha blending with the predetermined α value) or to opaque (no.alpha blending) in order to simplify operations for a user. A user could also specify that every time a particular software application is opened its window is alpha blended to a preset degree, such as transparent for example.

Research has also been carried out on a metric that given a particular background and a particular font colour, can predict the readability of the text. That is, means for determining a level of interference as experienced by a user between the first and second display elements. In particular, work has been carried out in developing a metric to predict the readability or legibility of transparent or translucent text. In a situation where text is laid over some graphic background in a multi-layer display system, a software application could analyse, using the metric, whether the contrast between the two images was such that the text was difficult to read. If this analysis determined that it was likely that the text was difficult to read then the program could automatically change the colour or transparency of the text (or the background, or both) to increase the contrast and make the text more readable.

It is therefore possible for the control system of the present invention to adjust the viewing properties (for example colour, brightness, transparency or contrast) of a particular display element in order to improve the user's viewing experience. This could be necessary, for example, if a display element is allocated for display on top of a further display element, but because of its current visual properties (such as if the Text-on-Text problem existed), a user would find it difficult or non-ideal to view the particular display element.

For example, as mentioned previously, a dark display element on a rear (further away from the viewing surface of the display device) display layer will reduce the amount of light available for illuminating an overlapping display element on a front (closer to the viewing surface) display layer. In this case, even if the display element on the front layer is active, it will be at least partly occluded or obscured. Accordingly, the present invention would automatically adjust a visual property (such as the transparency or colour or brightness) of the display element on the rear display layer, at least in the overlapping portion, so that the visibility of the active (front) display element is increased.

In contrast, if a display element on a rear display layer is active and there is a display element on a front display layer at least partially obscuring it, then a visual property (such as the transparency or colour or brightness) of the display element on the front layer may be automatically adjusted, so that the visibility of the active (rear) display element is increased.

In both examples, a similar or improved result may be achieved by adjusting the visual properties of the display elements on both the front and rear display layers. For example, if a display element in a rear display layer was coloured red and a foreground, overlapping display element was coloured green, then depending upon which display element was active, different proportions of the two colours could be combined and displayed on the front and/or back display layers, at least in the overlapping portion of the display elements.

That is, if the foreground (red) display element was active, the overlapping portion could be made to appear purple (that is the combination of moistly red and a little green) by either not colouring the overlapping portion at all in the rear display layer and colouring the overlapping portion purple in the front display layer or by adjusting the colours of both display elements in the overlapping portion in such a way that the combination appears purple. However, it is necessary to bear in mind that the colours rendered in the two separate layers can not be considered totally independently in their contribution to the resultant cumulative colour as detected by a viewer of the display—that is, the darker or less transparent the rear display element is, the less light that will be available to illuminate the front display layer and therefore the front display element's appearance is effected by the properties of the rear display element.

If however the background (green) display element was active, then the overlapping portion could be made to appear a slightly reddish green (that is, a combination of mostly green and a little red). This could be achieved in either of the ways described above.

Alternatively or in conjunction with the above automatic adjustment of visual properties, the present invention also contemplates moving display elements laterally, within their current display layer, in order to remove overlap. Furthermore, a foreground display element in a front display layer may be moved wholly within a background display element on a rear display layer if the rear display layer has a suitably sized area of appropriately rendered space. For example, if the background display layer had an area of white space within which the foreground display layer could fit, then the present invention may move the foreground display element over the white space area.

Although in the above description reference is made to overlap of two display elements, it is of course possible that overlap occurs between more than two display elements and the present invention aims to improve the legibility or "viewability" of all overlapped portions. For example, more than one display element may be provided in a first layer, all of which overlap with different portions and/or share common overlapping portions with a further display element on a different display layer. Alternatively, more than two display layers may be provided, each of which includes a respective display element which overlaps with one or more of the other display elements, either independently or sharing some common overlapping portion or portions.

Furthermore, in some case, display elements on two or more display layers may be rendering associated display elements which are linked to effectively form a single display element. For example, an image may be displayed in "3-D" over multiple display layers so that movement of the any of the images display elements causes movement of all of the separate associated display elements on the respective layers. In this case, if overlap occurs between the "3-D" image and a further display element, then any adjustment in position or visual properties required of the "3-D" image will be carried out on each of its constituent display elements so that it is treated effectively as a single display element.

Interactive Visual Summary—User Interface

Figure 2:
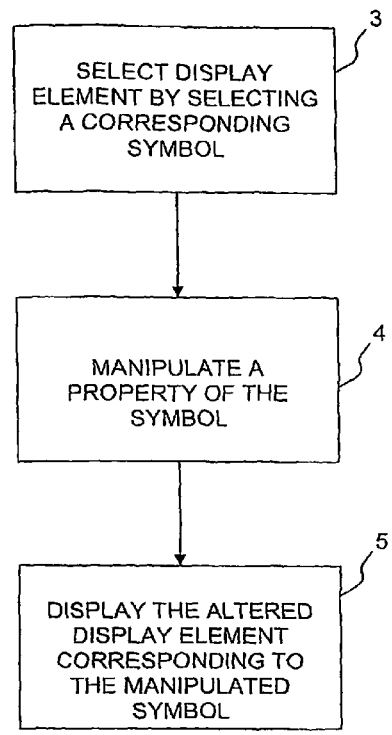
FIG. 2 is a flow diagram of information steps executed by software employed in conjunction with a preferred embodiment of the present invention.

FIG. 2 illustrates a block schematic flowchart diagram of information flows and steps executed by software employed in conjunction with a further preferred embodiment of the present invention.

In initial step 3 the method executed consists of the software involved detecting a display element selection action by a user and subsequently generating at least one display element selection identifier in response. The detection of user selection actions can be completed through a receiving control component such as screen based toolbars, hot key selections or radio buttons displayed on the MLD to the user on any convenient layer of the display.

One implementation of display element selection comprises the use of a control toolbar or interface which is in the form of a graphical representation which a user is able to interact with by, for example, dragging and dropping (using a mouse or touch screen for example) onto areas representing the various display layers, icons or symbols representing various display elements on the multi-layer display system. For example, the graphical representation could be of a shelving system (such as book shelves) wherein each shelf represents a display layer onto which an icon representing a particular display element may be dropped to thereby instruct the allocation or assignment of that display element to the chosen display layer.

Another possibility would be to simply provide a miniaturised graphical representation of the various display layers and display elements thereon in two dimensions. The various overlapped display layers would however be displayed side-by-side.

In a further alternative, the user interface could be provided as a miniaturised two dimensional representation of the appearance of the display apparatus from the viewer's perspective. That is, the user interface would include symbols representative of each of the display elements shown on the various display layers although the user interface would be rendered in a single layer. In order to indicate to a user the display layer to which each display element is currently assigned, different colours could be used for each display layer. For example, all display elements on a front display layer could be coloured green while all display elements on the next display layer could be coloured red for example. Similarly, the outlines of symbols representing display elements in different layers could be visually different (for example, solid line, dashed line, dot-dash line) or a small numeral ("1", "2", "3" for example) could be positioned within each symbol in the user interface to identify its display layer.

Accordingly, the control toolbar component enables the user to select a display element and a display layer and to thereby generate a display element selection identifier and a display layer selection Identifier. After a display element selection identifier has been generated for the display element selected by a user, step 4 is then carried out in which the user manipulates the selected display element. The manipulation may consist in shifting the symbol representing a particular display element to an alternative display layer. This layer selection action is detected through the user interacting with a control component, which will in turn trigger the generation of a display layer selection identifier which identifies the selected destination display layer on which the user wishes to have the selected display element presented. As previously mentioned, in some MLD systems, (such as those containing only two layers), this step may be optional. Alternatively, the manipulation may consist in making the selected display element active, altering its visual properties or changing its x,y position within its original display layer.

In the last step, step 5, the user manipulation carried out on the symbol representative of the selected display element is transferred to the actual display element so that it is moved to a selected display layer or it is made active or it's x,y location is changed for example. This is accomplished using graphics subsystems and software ordinarily employed by the MLD to display content on each of its layers based upon the generated display element selection identifier and display layer selection identifier. In the case where the selected display element is to be transferred to a new destination display layer and this results in an overlap of display elements, the above described system of automatically adjusting the visual properties of the first and/or second display elements may be implemented.

Of course, the above described first (automatic allocation/alteration) and second (user controlled allocation) embodiments could be combined so that some display elements within a multi-layer display system are always automatically assigned while user input is used to assign other display elements.

Figure 3A:
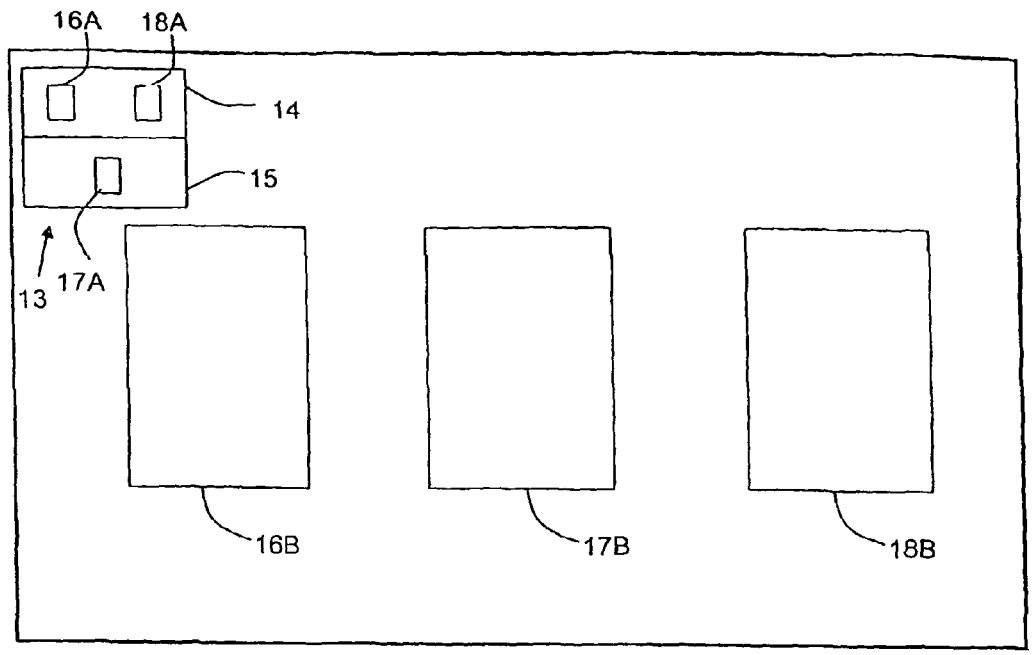
FIGS. 3A & 3B are schematic diagrams of a screen display in a multi-layer display system incorporating the user interface of the present invention.

FIG. 3A is a schematic diagram showing an example of how the user interface according to the present invention may look in practice. A multi-layer display system 6 includes for example two overlapped display layers, one directly in front of the other. A user interface 13 includes graphical representations of first (or front) 14 and second (or back) 15 display layers of the MLD system. Symbols 16A and 17A within the user interface represent display elements 16B and 17B in the first display layer 14 while symbol 18A represents display element 18B in the second display layer 15. Display elements 16B and 178 may, for example, be GUI windows. Display elements 16B, 17B and 18B may be easily and conveniently manipulated (moved within their layers, moved to different layers, made active/inactive or have their visual properties such as colour, brightness, transparency or saturation) by a user interacting with the representative symbols within user interface 13.

User interface 13 may be adjustable in size and may be moved to a different display layer. However, it may be advantageous if the user interface were to automatically switch to the display layer in which the user is currently working (that is, in which a selection element such as a mouse pointer is currently positioned). Alternatively, within the user interface portion of the display apparatus, operation of a mouse pointer within any display layer could manipulate the symbols within the user interface, even if the interface is positioned on a different layer than the layer in which the mouse pointer is currently positioned.

Figure 3B:
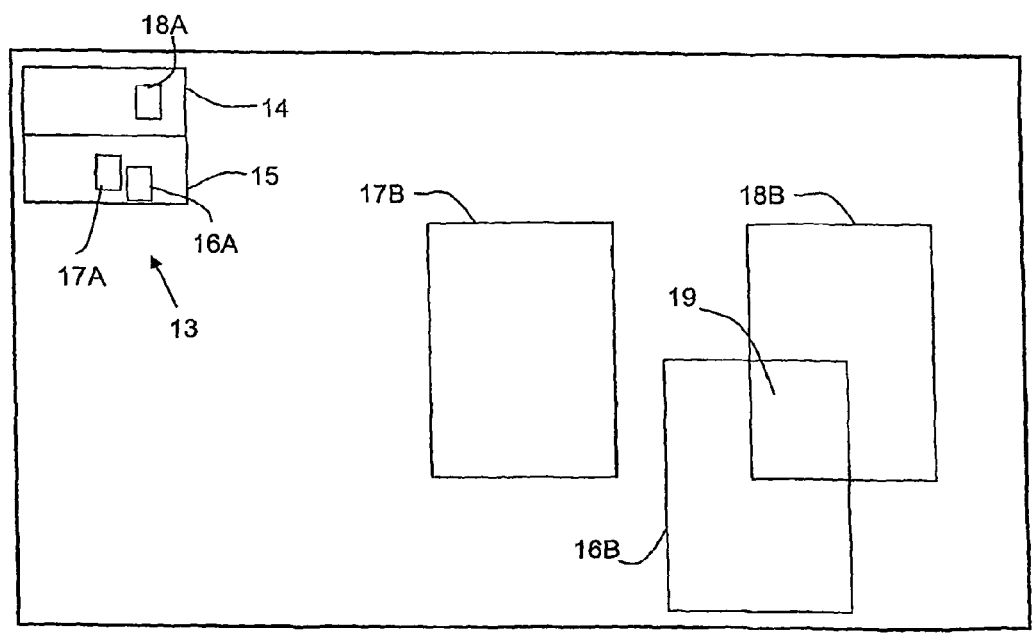

FIG. 3B is very similar to the schematic diagram of FIG. 3A but shows the display system of FIG. 3A subsequent to a user selecting and moving (by dragging and dropping for example) symbol 16A to display layer 15. It can be seen that while within display layer 15 there is no overlap of display elements, display elements 16B and 17B are in fact overlapped and share a common overlapped portion 19. It will be appreciated that the present invention aims to improve the ease with which a viewer may discern information from or observe information within the overlapped portion 19 by either altering visual properties of the display elements or adjusting their position(s).

Figure 4:
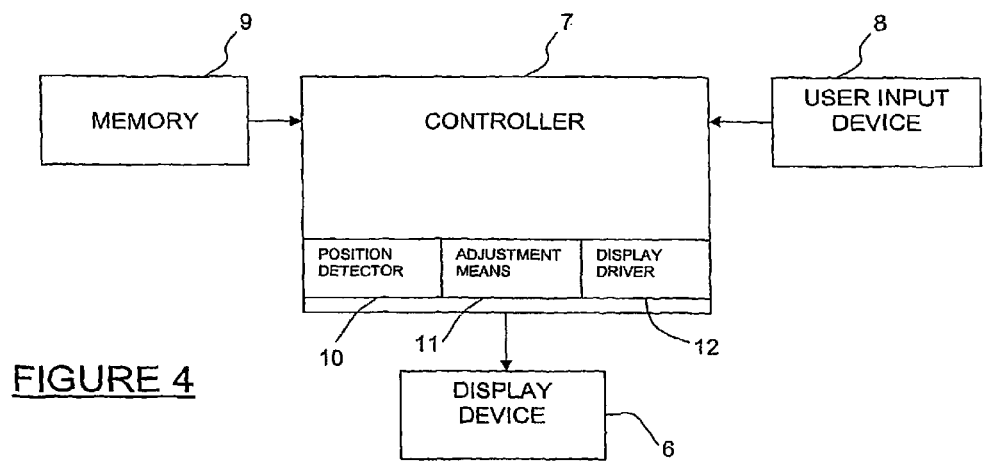
FIG. 4 is a block diagram of apparatus used in conjunction with the flow diagram of FIG. 2.

FIG. 4 is a block diagram of a preferred embodiment of hardware for carrying out the present invention. A display device 6 which may comprise multiple interconnected multi- or single-layer devices is connected to a control means 7 which controls the illumination of the various display layers of the display device. A user input device 8 provides user input to the control means and a memory device 9 provides storage for digital data files and executable software programs which, when executed, may control the operation of the control means 7.

Control means or controller 7 may comprise or include a microprocessor and also includes a position detector 10 for detecting or receiving the position of a display element to be displayed on (all already being displayed on) the display device and determining whether overlap will occur between different display elements. The control means 7 also includes an adjustment means 11 for automatically adjusting either the position of a first and/or second overlapped display element or for automatically adjusting at least one visual property of at least the overlapping portion of the first and/or second display element. The adjustment means may also determine whether the display element has an associated pre-set display layer preference and may makes its adjustment based upon detected visual properties (such as colour, brightness or contrast) of the overlapping display elements or upon a preset display layer preference or upon a determination that one or both layers contain text matter. A display driver 12 is also provided within the controller 7 for generating appropriate electronic signals to the MLD system to cause the adjusted display elements to be rendered on their respective display layers of the display device 6.

It should be noted that the means 10, 11 and 12 could be provided by physical hardware such as electronic circuits or could be provided by software routines executed by the control means 7.

Aspects of the present invention have been described by way of example only and it should be appreciated that modifications and additions may be made thereto without departing from the scope thereof.

The invention claimed is:

1. A method of displaying images, said method comprising:
    displaying a first image and a second image on a multi-component display, wherein said displaying further comprises displaying a first portion of said first image on a first display screen of said multi-component display, wherein said displaying further comprises displaying a second portion of said second image on a second display screen of said multi-component display;
    determining an interference associated with said first and second images associated with an overlapping region of said first portion and said second portion;
    detecting a user interaction with a user interface, wherein said user interaction is associated with a reduction in said interference, wherein said user interface is separate from said first and second images, and wherein said user interface is displayed using a display screen selected from a group consisting of said first and second display screens, wherein said user interaction selects said first image as an active image and said second image as a non-active image;
    combining visual properties of said overlapping region of said first portion and said second portion into a resultant combined visual property;
    applying said resultant combined visual property to pixels of active display elements in said first display screen displaying said overlapping region of said first portion of said first image while visual properties applied to pixels of said first display screen displaying another region of said first portion that is not overlapping with said second portion of said second image remain unaltered;
    adjusting an alpha value of said second portion associated with said overlapping region to reduce said interference as applied to pixels of inactive display elements in said second display screen; and
    displaying said first and second images on said multi-component display in accordance with said user interaction to reduce said interference.

2. The method of claim 1, wherein said user interface comprises a first element associated with said first display screen and a second element associated with said second display screen.

3. The method of claim 1, wherein said user interface comprises a third element associated with said first image, wherein said user interaction comprises a user interaction with said third element, and wherein said user interaction with said third element is operable to initiate an operation selected from a group consisting of making said first image active, changing a position of said first image on said first display screen, and displaying said first image on said second display screen.

4. The method of claim 1, wherein said user interface comprises a fourth element associated with said second image, and wherein said user interaction comprises a user interaction with said fourth element, and wherein said user interaction with said fourth element is operable to initiate an operation selected from a group consisting of making said second image active, changing a position of said second image on said second display screen, and displaying said second image on said first display screen.

5. The method of claim 1 further comprising:
detecting an overlap of said second portion of said second image by said first portion of said first image; and
displaying said first and second images on said multi-component display to increase visibility of said second portion of said second image.

6. The method of claim 5, wherein said displaying said first and second images on said multi-component display to increase visibility further comprises displaying said first and second images on said multi-component display to reduce said overlap of said second portion of said second image by said first portion of said first image.

7. The method of claim 5, wherein said displaying said first and second images on said multi-component display to increase visibility further comprises displaying said first and second images without said overlap of said second portion of said second image by said first portion of said first image.

8. The method of claim 5, wherein said displaying said first and second images on said multi-component display to increase visibility further comprises changing a position of said first image on said first display screen.

9. The method of claim 5, wherein said displaying said first and second images on said multi-component display to increase visibility further comprises changing a position of said second image on said second display screen.

10. The method of claim 5, wherein said displaying said first and second images on said multi-component display to increase visibility further comprises displaying said first and second images on said multi-component display to increase visibility of an active image, wherein said active image is selected from a group consisting of said first image and said second image.

11. The method of claim 5, wherein said displaying said first and second images on said multi-component display to increase visibility further comprises displaying said second image on said first display screen.

12. The method of claim 5, wherein said displaying said first and second images on said multi-component display to increase visibility further comprises displaying said first image on said second display screen.

13. The method of claim 5, wherein said displaying said first and second images on said multi-component display to increase visibility further comprises changing a visual property of at least one image selected from a group consisting of said first image and said second image.

14. The method of claim 13, wherein said visual property is selected from a group consisting of a color, a brightness, and a transparency.

15. The method of claim 13, wherein said visual property comprises a contrast between said first portion of said first image and said second portion of said second image.

16. A system comprising:
means for displaying a first image and a second image on a multi-component display, wherein said means for displaying further comprises means for displaying a first portion of said first image on a first display screen of said multi-component display, wherein said means for displaying further comprises means for displaying a second portion of said second image on a second display screen of said multi-component display;
means for determining an interference associated with said first and second images associated with an overlapping region of said first portion and said second portion;
means for detecting a user interaction with a user interface, wherein said user interaction is associated with a reduction in said interference, wherein said user interface is separate from said first and second images, and wherein said user interface is displayed using a display screen selected from a group consisting of said first and second display screens, wherein said user interaction selects said first image as an active image and said second image as a non-active image;
means for combining visual properties of said overlapping region of said first portion and said second portion into a resultant combined visual property;
means for applying said resultant combined visual property to pixels of active display elements in said first display screen displaying said overlapping region of said first portion of said first image while visual properties applied to pixels of said first display screen displaying another region of said first portion that is not overlapping with said second portion of said second image remain unaltered;
means for adjusting an alpha value of said second portion associated with said overlapping region to reduce said interference as applied to pixels of inactive display elements in said second display screen; and
means for displaying said first and second images on said multi-component display in accordance with said user interaction to reduce said interference.

17. The system of claim 16, wherein said user interface comprises a first element associated with said first display screen and a second element associated with said second display screen.

18. The system of claim 16, wherein said user interface comprises a third element associated with said first image, wherein said user interaction comprises a user interaction with said third element, and wherein said user interaction with said third element is operable to initiate an operation selected from a group consisting of making said first image active, changing a position of said first image on said first display screen, and displaying said first image on said second display screen.

19. The system of claim 16, wherein said user interface comprises a fourth element associated with said second image, and wherein said user interaction comprises a user interaction with said fourth element, and wherein said user interaction with said fourth element is operable to initiate an operation selected from a group consisting of making said second image active, changing a position of said second image on said second display screen, and displaying said second image on said first display screen.

20. The system of claim 16 further comprising:
means for detecting an overlap of said second portion of said second image by said first portion of said first image; and
means for displaying said first and second images on said multi-component display to increase visibility of said second portion of said second image.

* * * * *